Aug. 6, 1929.                W. F. PETERSON                1,723,205
                                BALL COCK
                            Filed July 30, 1927
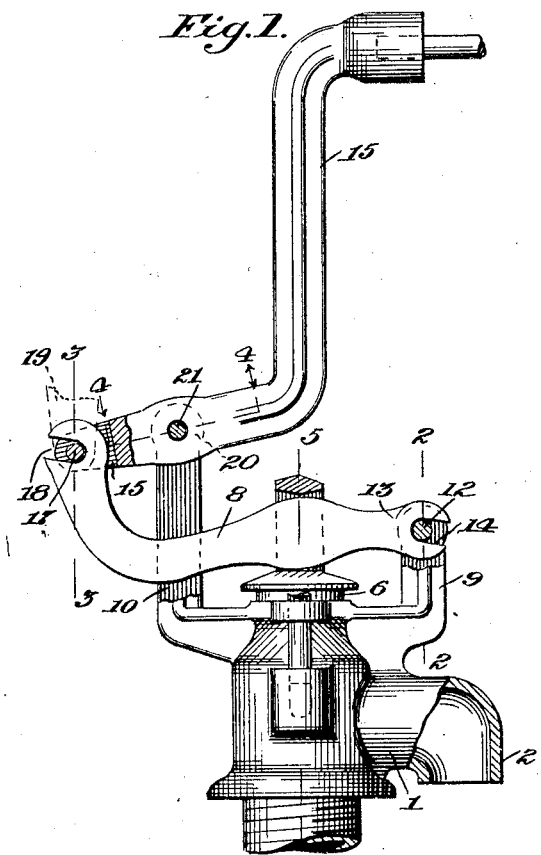
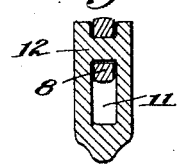
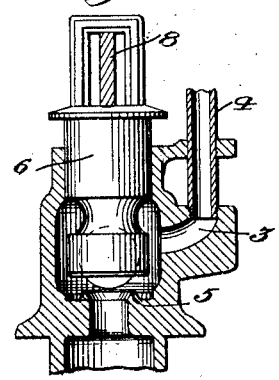
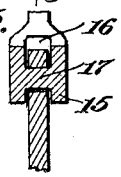
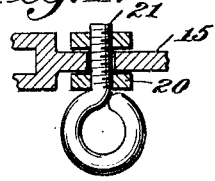
Inventor:
W. F. Peterson,
By Sturtevant Mason
    Attys.

Patented Aug. 6, 1929.

1,723,205

UNITED STATES PATENT OFFICE.

WALKER FAIRFIELD PETERSON, OF BALTIMORE, MARYLAND, ASSIGNOR TO BALTIMORE VALVE CORPORATION, OF BALTIMORE, MARYLAND, A CORPORATION OF MARYLAND.

BALL COCK.

Application filed July 30, 1927. Serial No. 209,613.

The invention relates to new and useful improvements in ball cocks for flush tanks and the like where it is desired to automatically regulate the supply of water thereto.

An object of the invention is to provide a ball cock wherein the actuating mechanism for the valve is very simple and of few parts, which may be readily assembled.

A further object of the invention is to provide an actuating mechanism for the valve of a ball cock, wherein the actuated lever has a slidable detachable connection with the bracket on which it fulcrums, with the valve which it actuates, and the lever by which it is actuated.

A further object of the invention is to provide an actuating mechanism of the above type, wherein the parts are held assembled on the valve casing solely by the pivot pin of the actuating lever, so that when the pivot pin is removed, the parts may be readily disassembled.

These and other objects will in part be obvious and will in part be hereinafter more fully disclosed.

In the drawings which show by way of illustration one embodiment of the invention—

Figure 1 is a view partly in section and partly in side elevation showing a ball cock embodying the improvement;

Fig. 2 is a section on the line 2—2 of Fig. 1:
Fig. 3 is a section on the line 3—3 of Fig. 1;
Fig. 4 is a section on the line 4—4 of Fig. 1, and
Fig. 5 is a section on the line 5—5 of Fig. 1.

The invention is directed broadly to the actuating mechanism for the valve of a ball cock. The valve casing and the valve therefor are of the usual construction. The valve casing is provided with two brackets, one of which serves as a supporting fulcrum for the actuated lever, and the other of which serves as the supporting fulcrum for the actuating lever. The actuated lever has a sliding detachable connection with a valve of the usual type. The fulcrum bracket for the actuated lever has the upper end thereof forked and provided with a cross pin which is preferably cast integral with the bracket. The end of the actuated lever is slotted, and the slot is open at the end of the lever, so that by an endwise movement of the lever, the slotted end can be placed in engagement with the cross pin, and thus the lever assembled on its fulcrum. The end of the actuating lever is forked, and is provided with a cross pin which is preferably integral with the lever. The other end of the actuated lever is likewise slotted, with the open end of the slot facing outwardly, or away from the valve. This slotted end is adapted to be engaged with the cross pin carried by the actuating lever. The actuating lever is then swung into its operative position and secured to the fulcrum bracket therefor by means of a removable fulcrum pin. When this removable fulcrum pin is put in place, all of the parts are held in assembled position, and this is the only removable element necessary to hold the parts assembled.

Referring more in detail to the drawings, the improved ball cock includes a valve casing 1 which is secured to the water supply in any suitable way. This valve casing has a discharge nozzle 2 through which the water is discharged into the flush tank. The valve casing also has an outlet 3 connected to a pipe 4 adapted to discharge into the overflow pipe of the flush tank in the usual manner. Within the valve casing is a valve seat 5, and a valve 6 of the usual type is adapted to engage said valve seat and close the supply of water to the nozzle 2 and the pipe 4. This valve 6 is provided with a slotted head 7 through which an actuated lever 8 is adapted to be inserted. The actuated lever, when placed in this head 7, substantially fills the entire height of the space, and this makes a very efficient connection between the actuated lever and the valve. The valve casing is provided with two brackets 9 and 10. The bracket 9 is shorter than the bracket 10. This bracket 9 serves as a fulcrum support for the actuated lever. The bracket at the upper end is forked, as indicated at 11 in Fig. 2, and a pivot pin 12 extends across from one side of the forked end to the other, and is preferably cast integral with the bracket. The fulcrum end 13 of the actuated lever 8 is provided with a slot 14 which extends to the end of the lever and faces outwardly away from the connection to the valve head. This slot is adapted to be placed over the pin 12, and thus the actuated lever is attached to its supporting fulcrum bracket. The bracket 10 is provided with a slot through which the actuated lever passes, as clearly shown in Fig. 1.

Mounted on the bracket 10 is the actuating lever 15. This actuating lever is adapted to be attached to the controlling ball of the flush tank. The lower outer end of the lever 15 is forked as indicated at 16 (Fig. 3). The pivot pin 17 extends across from one side of the forked end to the other and is preferably cast integral with the lever. The opposite end of the actuated lever from the fulcrum support therefor is formed with a slot 18. This slot faces outwardly away from the valve head 7, and is adapted to receive the pivot pin 17. The actuating lever 15 is placed in the dotted line position 19 in Fig. 1, after which the pivot pin can be readily placed in the slot 18. Then the actuating lever is turned down so that the lever is placed in the slot 20 in the upper end of the bracket 10. The pivot pin 21 is placed through the slotted end of the bracket 10, and is threaded into one of the forked ends of the bracket which provides a fulcrum for the lever. This pivot pin 21 is the sole means for holding the parts assembled. When it has been put in place, the actuated lever cannot move endwise so as to be released from the fulcrum pin or the pin on the actuating lever.

From the above it will be apparent that a very simple form of actuating mechanism has been provided for the valve of a ball cock. This actuating mechanism consists of few parts, and therefore, it can be cheaply made and the parts can be quickly assembled, and are not liable to get lost when disassembled for purpose of repair. The only removable parts in the entire ball cock are the valve, the actuated lever, the actuating lever and the pivot pin for the actuating lever. The connection of the actuated lever to the fulcrum support therefor is a detachable slidable connection, and likewise, the connection of the actuating lever to the actuated lever is a detachable slidable connection. The slots which bring about these slidable detachable connections are so disposed that when the actuating lever is secured in place, the actuated lever cannot move endwise so as to become disconnected, either from the fulcrum support therefor or from the actuating lever.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. A ball cock comprising a valve casing, spaced brackets supported by the valve casing, a valve movable in the casing, an actuating lever, means for pivotally supporting said actuating lever on one of said brackets, an actuated lever having a detachable connection with the valve, a slidable detachable connection with the actuating lever so that the said actuated and actuating levers may be detached one from another by a relative sliding movement of said actuating lever, and a slidable detachable connection with the other bracket so that said actuated lever may be detached from said other bracket by a relative endwise movement of said actuated lever in the same direction as said relative movement of said lever, said means for pivotally supporting said actuating lever preventing the relative sliding movement thereof and also thereby preventing the relative endwise movement of said actuated lever whereby both said levers are held in assembled position on the valve casing.

2. A ball cock comprising a valve casing, two spaced brackets supported at the opposite sides of said valve casing, a valve disposed between said brackets and movable in the casing, one of said brackets having a pivot pin formed integral therewith, an actuated lever having a detachable connection with the valve, and a slidable detachable connection with the pivot on said bracket, an actuating lever having a forked end and a pivot pin formed integral with said lever, said actuated lever having a detachable slidable connection with the pivot pin of said actuating lever, and means for pivotally supporting said actuating lever on said other bracket.

3. A ball cock comprising a valve casing, two spaced brackets supported at the opposite sides of said valve casing, a valve disposed between said brackets and movable in the casing, one of said brackets having a pivot pin formed integral therewith, an actuated lever having a detachable connection with the valve, a slidable detachable connection with the pivot on said bracket, an actuating lever having a forked end and a pivot pin formed integral with said lever, said actuated lever having a detachable slidable connection with the pivot pin of said actuating lever, and means for pivotally supporting said actuating lever on said other bracket, said slidable detachable connections between the actuated lever, its fulcrum bracket and the actuating lever being so disposed that the means for pivotally supporting said actuating lever holds both levers in assembled position.

In testimony whereof, I affix my signature.

WALKER FAIRFIELD PETERSON.